UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYES AND PROCESS OF MAKING SAME.

1,086,123. Specification of Letters Patent. Patented Feb. 3, 1914.

No Drawing. Original application filed March 5, 1910, Serial No. 547,414. Divided and this application filed April 5, 1911. Serial No. 619,105.

*To all whom it may concern:*

Be it known that I, OSCAR BALLY, Ph. D., chemist, citizen of the Swiss Republic, residing at Mannheim, Germany, have invented certain new and useful Improvements in Anthracene Dyes and Processes of Making Same, which invention is divided out of my application for Letters Patent filed March 5, 1910, Serial No. 547,414, and of which the following is a specification.

This invention relates to the production of coloring matters of the anthracene series and is divided out of my application for patent Serial No. 547,414, filed March 5, 1910.

I have discovered new condensation products of the anthracene series of the type indicated by the general formula

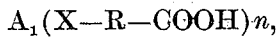

in which $A_1$ represents a substituted anthraquinone residue containing only one carbonyl group intact, such for instance as benzanthrone, anthrapyridone, and the like, X represents a substituent which effects the union of the anthraquinone residue with the carboxylic acid, and for this purpose sulfur and the imino group are equivalents, R is a simple or substituted aromatic residue, and although in the foregoing formula I represent the products as free acids, I would explain that the salts of the acids with metal or alkyl- or aryl-ethers thereof are equivalent and included in the formula, while $n$ is a number less than three. These new condensation products can be obtained by causing a benzanthrone derivative or an anthrapyridone derivative or the like, which contains one or more than one substituted group or atom, for instance chlorin, to react upon a thiophenol-carboxylic acid body or upon an amino-aryl-carboxylic acid body. Among the thiophenol-carboxylic acid bodies and the amino-aryl-carboxylic acid bodies which can be used according to my invention I include thiophenol-carboxylic acids themselves, amino-aryl-carboxylic acids themselves, or a derivative of any one of these compounds, for instance a salt or ester thereof. If the above mentioned thiophenol-carboxylic acids or amino-aryl-carboxylic acids be used in the free state for the condensation, the carboxyl group is liable to be split off to a certain extent, and to this extent uncarboxylated compounds are obtained, but when the salts are used in this condensation, the desired carboxylated condensation compounds are obtained smoothly. When preparing the new condensation compounds according to this invention from halogenated benzanthrones or anthrapyridones containing more than one proportion of halogen, it is possible, first, to replace a portion of the halogen using one of the thiophenol-carboxylic acid compounds or of the amino-aryl-carboxylic acid compounds, and then to replace a further portion with the same or a different thiophenol-carboxylic acid compound or amino-aryl-carboxylic acid compound, so that in this way mixed condensation products can be obtained. The condensation can be effected with or without the addition of a substance which acts catalytically.

On treating those new condensation products which contain a carboxyl group in the ortho position to the sulfur atom or to the imino group with a condensing agent, such for instance as sulfuric acid, fuming sulfuric acid, chlorsulfonic acid, phosphoric anhydrid, aluminum chlorid, and zinc chlorid, either in the presence or absence of a suitable diluting agent, new coloring matters can be obtained of a constitution corresponding to the general formula

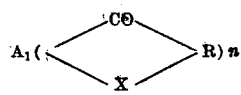

in which the symbols have the same significance as hereinbefore explained. When concentrated sulfuric acid, or other agent which is capable of bringing about sulfonation, is used for effecting the condensation, unsulfonated products are, as a rule, obtained when only a moderate reaction takes place, while by more energetic reaction sulfonated products result. The unsulfonated products can, if desired, be subsequently treated with sulfonating agents and be converted into their sulfonic acid derivatives. The unsulfonated products are capable of use as vat coloring matters, yielding from red to violet shades of excellent fastness. They are insoluble in water and in dilute acids and alkalis, but are soluble in concentrated sulfuric acid yielding from brown to violet solutions.

The following examples will serve to illustrate the manner in which the new condensation products and coloring matters can be obtained. The parts are by weight.

Example 1: Mix together 100 parts of 1.5-dichlor-benzanthrone, 150 parts of potassium anthranilate and 2 parts of copper oxid and 1,500 parts of nitrobenzene, and heat the mixture at its boiling point until no further separation of the condensation product is observable. Allow the mixture to cool, collect the solid product, wash it with alcohol, and dry it. The method of procedure can further be varied by using solvents, or diluents, other than nitrobenzene and instead of copper oxid, other condensation agents which act in a similar way can be employed.

Example 2: Mix together 100 parts of 1.5-dichlor-benzanthrone, 125 parts of thiosalicylic acid, 100 parts of caustic potash, and 2,000 parts of absolute alcohol. Boil the mixture till no unchanged dichloranthraquinone is noticeable, allow the mass to cool, collect, by filtering, the potassium salt of the anthraquinone-1.3-bisthiosalicylic acid which is obtained, dissolve in water, and precipitate the new condensation product in the form of the free acid, by the addition of hydrochloric acid.

Example 3: Dissolve 1 part of benzanthrone-1.5-bisanthranilic acid (obtainable from 1.5-dichlor-benzanthrone and sodium anthranilate) in 10 parts of concentrated sulfuric acid and heat the solution, at about 100° C., until the color (which is at first green) has become yellowish red. Then pour the liquid into water and filter off the reaction product which separates out in violet flakes.

Example 4: Introduce one part of benzanthrone-1.5-bisthiosalicylic acid (obtainable from 1.5-dichlor-benzanthrone and sodium thiosalicylate) into 5 parts of fuming sulfuric acid, containing 23% of free $SO_3$, while avoiding as far as possible, a rise in temperature. The solution, which is at first violet, gradually becomes brown and finally (after standing for some time) red. Then pour the reaction liquid into water and filter off and wash the product which separates out in red flakes.

On treating the product of the foregoing Examples 3 and 4 with a sulfonating agent, for instance with warm fuming sulfuric acid, sulfonic acids can be obtained. The sulfonic acid obtained from the product of Example 4 dyes wool brilliant red shades of great fastness.

In a similar manner, other analogous compounds can be obtained from the other condensation products hereinbefore mentioned.

In the following table I give the appearance and properties of some of the intermediate condensation products most readily obtainable according to my invention:—

| Condensation product from— | Appearance of the K-salt. | Solution in— | | | |
|---|---|---|---|---|---|
| | | Warm water. | Glacial acetic acid. | Conc. cold $H_2SO_4$. | $H_2SO_4$ and boric acid. |
| 4-Chlor-2-methyl-anthrapyridone +anthranilic acid. | Red-brown powder. | Violet red. | Cherry red. | Brown-red. | Cherry-red. |
| Brom-benzanthrone+anthranilic acid. | Violet powder. | Fuchsin red. | Orange-yellow. | Orange-yellow. | Orange-yellow. |

Now what I claim is:—

1. The process of producing coloring matter of the anthracene series by subjecting to the action of a condensing agent a compound of the type indicated by the general formula $$A_1(X—R—COOH)n$$

in which $A_1$ represents a substituted anthraquinone residue containing only one carbonyl group intact, X represents a substituent effecting the union of the anthraquinone residue with the carboxylic acid, and R represents an aromatic residue and $n$ is a number less than three.

2. As new articles of manufacture the coloring matters of the anthracene series having the general formula

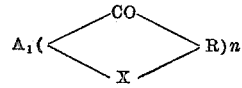

which can be obtained by subjecting to the action of a condensing agent a compound of the type indicated by the general formula $$A_1(X—R—COOH)n$$

in which $A_1$ represents a substituted anthraquinone residue containing only one carbonyl group intact, X represents a substituent effecting the union of the anthraquinone residue with the carboxylic acid, and R represents an aromatic residue, while $n$ is a number less than three, which new coloring matters are insoluble in water and in dilute acids and alkalis, but are soluble in concentrated sulfuric acid yielding from brown to violet solutions, in the unsulfonated state dye cotton from a vat red to violet shades of excellent fastness and which in the sulfonated state can be employed for dyeing wool.

In testimony whereof I have hereunto set my hand in the presence of two subscribing witnesses.

OSCAR BALLY.

Witnesses:
ERNEST G. EHRHARDT,
A. O. TILLMANN.